Patented Nov. 25, 1952

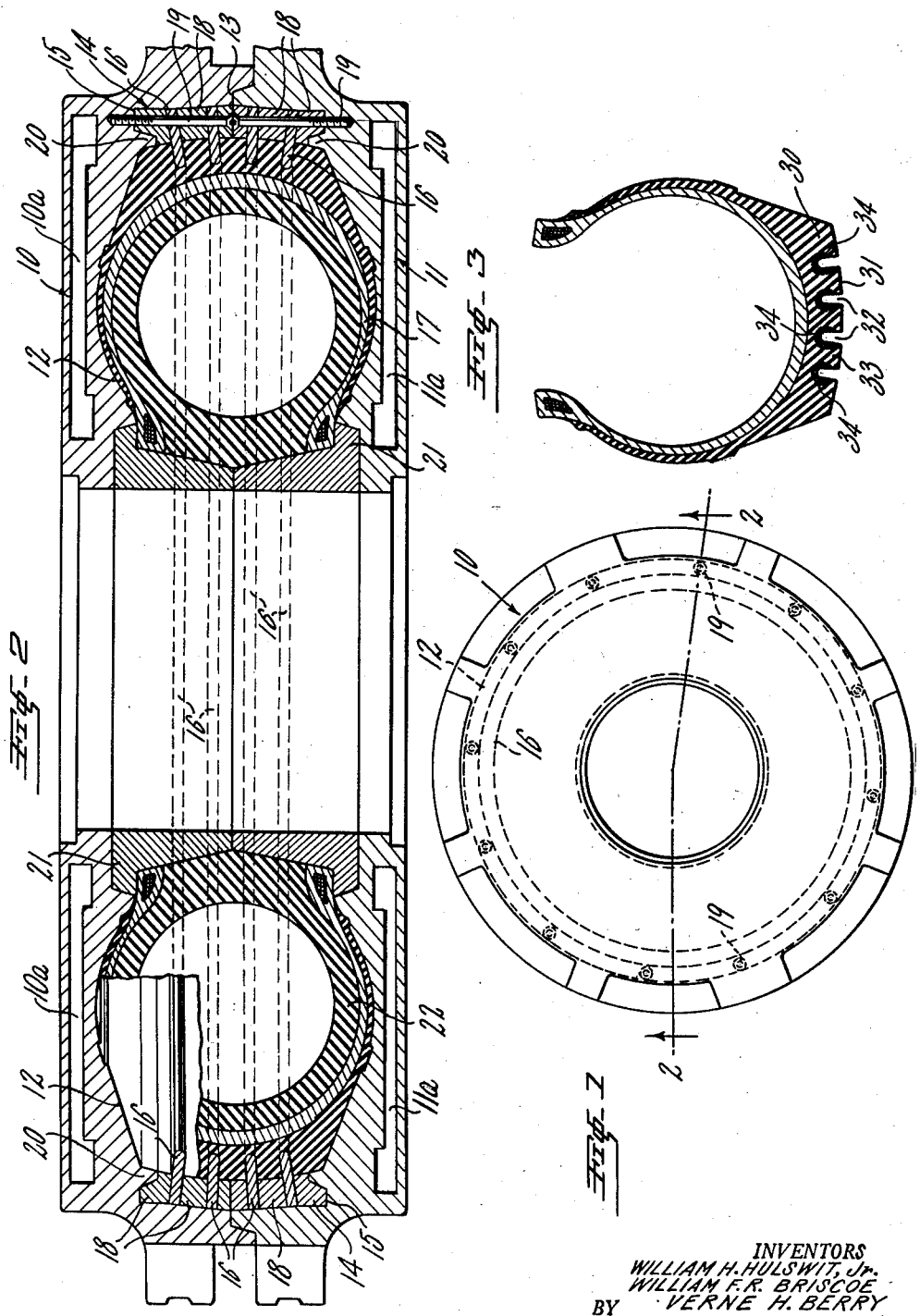

2,618,812

UNITED STATES PATENT OFFICE 2,618,812

PNEUMATIC TIRE MOLD

William H. Hulswit, Jr., Grosse Pointe, and William F. R. Briscoe and Verne H. Berry, Detroit, Mich., assignors to United States Rubber Company, New York, N. Y., a corporation of New Jersey Application April 19, 1950, Serial No. 156,843

5 Claims. (Cl. 18—38)

This invention relates to an improved pneumatic tire mold. More particularly it relates to a pneumatic tire mold in which means are provided for limiting the degree of vulcanization of the tire in the area of the bases of the tire tread grooves as compared with the tread portions, so that the groove surfaces of the vulcanized tire are less susceptible to cracking.

The method disclosed herein for making a pneumatic tire and the improved tire itself, are claimed in an application of W. H. Hulswit et al., Serial No. 156,841, filed of even date herewith and assigned to the same assignee as the present application.

In the past it has been a common failing of pneumatic tires that the bases of the grooves defining the anti-skid pattern of the tire tread tend to develop cracks. This groove-cracking is occasioned largely by the fact that the rubber of the groove bases is under tension when the tire is inflated, rendering the rubber particularly susceptible to attack by ozone in the air with consequent deterioration of the rubber composition. This type of deterioration is evidenced by cracking of the rubber surface. Continual flexing of the groove bases as the tire revolves aggravates this condition by causing the surface cracks to grow, or become enlarged. Such cracking is not only unsightly, but actually weakens the structure of the tire and may be a cause of premature failure of the tire.

It has been found that the tendency to groove cracking is greatly reduced if the tire is vulcanized in such a way as to leave the rubber composition in the area of the bases of the grooves partially unvulcanized, the remainder of the rubber composition of the tread being vulcanized to the normal extent, so that tread wear and tire strength are in no way sacrificed. The partially unvulcanized rubber composition at the bases of the grooves has been found to be far more resistant to the influences causing groove cracking than ordinary fully vulcanized rubber tread compositions, with the result that the tire gives more satisfactory performance in this respect.

A principal object of the invention is to provide an improved tire mold for vulcanizing a tire in such manner that the groove bases are less susceptible to cracking.

Another object is the provision of a tire mold in which the degree of vulcanization of the tire in the area of the groove bases may be varied.

A further aim is to provide a mold for equipping old or worn tires with a new tread surface embodying improved resistance to tread groove cracking.

Other objects and advantages will appear in the following detailed description, when read with reference to the accompanying drawing in which:

Fig. 1 is a plan view of a tire vulcanizing mold of this invention;

Fig. 2 is a sectional view on a larger scale of the mold of Fig. 1 taken along the lines 2—2 of Fig. 1, and showing a pneumatic tire containing a curing bag in place in the mold, a portion of the tire and curing bag being broken away; and Fig. 3 is a sectional view of a tire produced in the mold.

Referring to Figs. 1 and 2, the tire shaping and vulcanizing mold shown therein comprises an annular upper mold half 10 and an annular lower mold half 11 which together define a toroidal cavity 12 for the tire. The mold is split at a horizontal parting line 13 and may be opened for insertion and removal of the tire. The mold is adapted to be disposed within the usual enclosing chamber or press (not shown) which is adapted to clamp the mold halves 10 and 11 firmly together during vulcanization. Suitable means, such as steam jackets, are associated with such chamber or press for heating the mold from the outside, or the mold halves 10 and 11 may themselves contain suitable passageways (10a and 11a) in the walls thereof for circulating a fluid heating medium supplied to the passageways from a suitable source (not shown) in a manner well understood in the art.

Each mold half is provided with an annular tread block assembly 14 located at the outer periphery of the mold cavity 12. The tread block assembly 14 is disposed within a suitably shaped recess 15 in the mold half. The tread block assembly 14 includes projecting members or ribs 16 which extend into the mold cavity 12 for the purpose of impressing a suitable anti-skid pattern on the tread surface of a tire 17 in the mold cavity. Although the ribs 16 are in this case shown as straight circumferential ribs, it will be understood that projections or ribs of other suitable shapes and arrangements may be employed for the purpose of impressing the particular groove pattern desired on the tread surface of the tire 17.

The tread block assembly 14 further includes suitably shaped spacer ring members 18 interposed with the ribs 16, the whole assembly being held firmly together by spaced screws 19 passing into the parting faces 13 through transverse holes in the ribs and spacer rings, and threaded into the mold halves. An annular rim or flange 20 of the mold half intermeshes with a corresponding recess in the end of the tread block assembly 14 and aids in maintaining it securely in place.

The spacer ring members 18 are preferably made of a material of relatively high heat conductivity, such as aluminum, steel, or the like, to facilitate transfer of the greatest possible amount of heat from the mold to the tread portion of the tire, which portion, being relatively thick and heavy, requires proportionately greater heating in order to become uniformly vulcanized.

In the present invention means are provided for applying relatively milder vulcanizing conditions to the rubber tread composition in the area of the groove bases, compared to the vulcanizing conditions applied to the remainder of the tread. To this end, the projecting ribs 16 which form the grooves in the tire tread are made of a material having relatively low heat, conductivity compared to the conductivity of the remaining parts of the mold, especially the spacer rib members 18, in order that the amount of heat transmitted from the mold to the surfaces of the tire tread grooves will be relatively less than the amount of heat transmitted to the remaining portions of the tread. The ribs 16 may be made, for example, of a thermoset plastic material, such as a phenol-formaldehyde resin, reinforced with a material of low heat conductivity, such as fiber glass. Such a material has approximately 1/500 as much heat conductivity as aluminum, which is a preferred material of construction for the remaining portion of the tread block, such as the spaced members 18. Other materials having low heat conductivity, or insulating value, may also be employed for the ribs 16, such as ceramic materials, Carborundum, glass or fused silica. The relative effective coefficient of heat transfer of the rib members 16 is preferably 0.1% to 5.0% of that of the remainder of the tread block, as represented by ring spacers 18.

Each mold half is also provided at its inner diameter with a toe ring member 21 which may be welded or otherwise attached to the mold half, and which is adapted to impart the desired shape to the bead region of the tire 17 in cooperation with a curing bag 22, which is an inflatable toroidal form of extensible material, somewhat similar to an inner tube, and which is inserted in the tire before it is placed in the mold cavity. The curing bag 22 is provided with the usual inlet and outlet means (not shown) for circulation of a heated fluid medium under pressure through the hollow interior thereof for the purpose of expanding the tire 17 to cause it to conform to the shape of the mold, as well as for the purpose of supplying internal heat to the tire, whereby it may be vulcanized more rapidly and more uniformly.

In operation of the mold, a raw pneumatic tire 17 to be vulcanized is placed within the mold cavity 12 and the mold is closed as previously indicated. It will be understood that the tire 17 may first be built up in band form on a tire building drum in the conventional manner and subsequently shaped with the aid of a curing bag 22 in the usual vacuum shaping box. All of the foregoing steps are well understood by those skilled in the art, and require no detailed description here. As far as the present invention is concerned any suitable method may be employed for building and preliminary shaping of the tire. With the tire in place, the mold is then heated to vulcanizing temperatures, both by applying external heat thereto, and by introducing a heated fluid medium under pressure to the interior of the curing bag 22, the fluid medium also serving to expand the tire to cause it to fill out the mold cavity 12.

In conventional practice, every effort is made to so design the heat transfer characteristics of the mold, and to so proportion the relative temperature applied to the mold externally and internally, that the entire tire will be uniformly vulcanized to the optimum extent. Thus, it is important that no part of the tire be subjected to an excessive temperature, or be heated for too long a period, otherwise that portion might become over-cured and therefore have sub-standard physical and wearing properties. Similarly, it has heretofore been considered essential to insure that all parts of the raw tire be heated to a sufficiently high temperature for a sufficient length of time to effect a complete cure of the various rubber compositions of the tire, because partial or limited cure has been associated with undesirable physical properties, such as inferior strength and poor abrasion resistance.

In the present mold, the degree of cure of the tire tread composition in the surface of the bases of the tread grooves is deliberately limited, as by employing ribs 16 of relatively low heat conductivity compared to the remainder of the tread block, so that the ribs 16, in effect, serve as cooling or insulating ribs. This lowers the temperature of the tread composition in the area of the groove bases during the vulcanizing operation and thereby limits the degree of vulcanization which takes place, compared to the remaining portion of the tread.

Upon completion of the normal curing cycle, that is, upon attainment of full cure in the main body of the tire tread, the mold is opened and the vulcanized tire is removed therefrom in the usual manner. As indicated in Fig. 4 the tire so produced has a tread portion 30 composed of a single integral vulcanized rubber composition. This composition may be any of the usual rubber compositions, whether comprised of natural rubber, or synthetic rubbers, such as GR–S, conventionally employed for tire treads. The tread 30 has a road-contacting surface 31 which has imparted thereto an anti-skid pattern defined by circular grooves 32 and projecting anti-skid blocks 33. It will be understood that any other suitable anti-skid pattern may be impressed on the tread as desired by using a correspondingly shaped vulcanizing mold.

Shaded areas 34 at the bases of the grooves 32 have purposely been left partially under-cured with the result that this portion of the tread composition has exceptional resistance to cracking, and withstands considerably more flexing than would be the case if it were fully cured. At the same time, the road-contacting surface 31 and the block portions 33 have attained full cure so that these portions have the desired toughness and high abrasion resistance. Such a tire tread composition, although essentially integral, has selective degrees of cure, and therefore selective physical properties, in different parts thereof.

The relative degree of cure of the main body of the tread 30, as compared to the groove bases 34 is readily determinable by measuring any of those physical properties which normally vary with the degree of cure. Thus, for example, if the elongation-at-break is determined on samples of the rubber removed from the tire tread made in the mold of this invention, it is found that the groove base areas display considerably greater elongation-at-break than the road-contacting areas. Usually, satisfactory performance with respect to groove-cracking is obtained when the elongation-at-break of the rubber of the groove bases is from 1.05 to 1.25 times and preferably about 1.12 times the elongation-at-break of the rubber in the road contacting surfaces, the exact value in any given case depending on such variables as the nature of the particular rubber tread composition employed, and the service for which the tire is intended.

It has been found by actual test that a tire in which the surface of the groove bases its left partially under-cured as described gives markedly superior performance with respect to groove-cracking. In a flexing test, a sample of tire tread having grooves formed in a mold having relatively non-conducting projections made of ebonite displayed a flexing life of 182 kilocycles, compared to a life of only 111 kilocycles for a similar sample formed in a mold in which the projections were made of steel.

While the invention has been described with particular reference to a mold for manufacture of a new tire, it will be understood that old or worn tires may be provided with an improved tread using a mold constructed according to this invention. This may be accomplished by retreading the tire in the usual manner with a strip of vulcanizable rubber tread composition, but using a retreading mold in which means, such as relatively non-conducting groove-forming ribs, are employed for applying relatively milder vulcanizing conditions to the groove bases so that the resulting tread has the desired crack-resistant, partially-cured areas in the surfaces of the grooves.

From the foregoing, it is seen that the invention provides an economically constructed and conveniently used mold for producing a tire which is less susceptible to groove cracking.

Because the rubber of the groove surfaces is only partially cured, its modulus is relatively low, and therefore the stresses therein resulting from inflation and flexing are relatively low. Hence, the surface is less susceptible to fatigue failure from continually reversing applied stresses.

The under-cured stock in the groove surfaces has much more resistance to ozone than does fully cured stock, thereby imparting protection from ozone at the very point where ozone attack is normally most damaging.

Having thus described our invention what we claim and desire to protect by Letters Patent is:

1. A mold for vulcanizing a rubber tire having a cavity for accommodating the tire, and projecting means extending from the surface of said cavity for impressing a tread groove pattern on the tire, said projecting means being relatively less heat conductive than the adjacent surface of said cavity to control the degree of vulcanization of the rubber in the groove surface relative to the adjacent portions of the tire.

2. A mold for vulcanizing a pneumatic tire having a toroidal cavity for accommodating the tire, said mold having a tread-enclosing area for confining and shaping the tire tread, projecting areas on said tread-enclosing area for impressing a grooved anti-skid pattern on the tire tread, said projecting areas being comprised of a heat-insulating material for limiting the extent of vulcanization in the groove bases.

3. A mold for a pneumatic tire including two separable annular mold halves defining a toroidal cavity for the tire, said mold halves having tread blocks for confining and shaping the tire tread, projecting ribs on said tread blocks for imparting a grooved anti-skid pattern to the tire tread, and means for heating the mold, said projecting ribs being made of a material of low heat conductivity to limit the temperature applied to the grooves relative to the temperature of the remainder of the mold.

4. A mold for a pneumatic tire including two separable annular mold halves defining a toroidal cavity for the tire, said mold halves having recesses accommodating tread block assemblies for confining and shaping the tire tread, said tread block assemblies being comprised of projecting ribs and interposed spaced members, said projecting ribs being made of material of relatively low heat conductivity and said spacer members being made of material of relatively high heat conductivity.

5. A mold for retreading a pneumatic tire comprising a means defining a mold cavity for confining and shaping a strip of raw tire tread composition in engagement with a tire carcass, means for heating the strip of raw tread composition to vulcanizing temperature, projecting members extending into said mold cavity from said confining and shaping means for impressing a grooved anti-skid pattern on the said strip of raw tire tread composition within said cavity, said projecting members being relatively less heat conductive than the adjacent surface of said cavity to control the degree of vulcanization of the rubber in the groove surfaces relative to the adjacent portion of the said tread strip.

WILLIAM H. HULSWIT, Jr.
WILLIAM F. R. BRISCOE.
VERNE H. BERRY

REFERENCES CITED

The following references are of record in the file of this patent:

UNITED STATES PATENTS

| Number | Name | Date |
|---|---|---|
| 2,046,372 | Engstrom | July 7, 1936 |
| 2,297,017 | Overman | Sept. 29, 1942 |

FOREIGN PATENTS

| Number | Country | Date |
|---|---|---|
| 13,406 of 1923 | Australia | July 14, 1924 |